United States Patent
Mönnich

(10) Patent No.: US 11,148,285 B2
(45) Date of Patent: Oct. 19, 2021

(54) OPERATING A HAND-GUIDED ROBOT

(71) Applicant: Siemens Healthcare GmbH, Erlangen (DE)

(72) Inventor: Holger Mönnich, Friedberg (DE)

(73) Assignee: Siemens Healthcare GmbH, Erlangen (DE)

( * ) Notice: Subject to any disclaimer, the term of this patent is extended or adjusted under 35 U.S.C. 154(b) by 412 days.

(21) Appl. No.: 16/104,296

(22) Filed: Aug. 17, 2018

(65) Prior Publication Data

US 2019/0054619 A1  Feb. 21, 2019

(30) Foreign Application Priority Data

Aug. 17, 2017 (EP) .................................... 17186599

(51) Int. Cl.
*B25J 9/16* (2006.01)
*B25J 13/08* (2006.01)

(52) U.S. Cl.
CPC ............. *B25J 9/163* (2013.01); *B25J 9/1633* (2013.01); *B25J 9/1653* (2013.01); *B25J 13/085* (2013.01); *G05B 2219/39325* (2013.01)

(58) Field of Classification Search
CPC ........ B25J 9/163; B25J 9/1633; B25J 9/1653; B25J 9/1638; B25J 13/085; B25J 13/04; G05B 13/04; G05B 2219/39325
See application file for complete search history.

(56) References Cited

U.S. PATENT DOCUMENTS

| | | | |
|---|---|---|---|
| 6,356,807 B1* | 3/2002 | McGee | B25J 9/1692 29/407.04 |
| 9,144,905 B1* | 9/2015 | Sinapov | G06T 19/00 |
| 10,814,484 B2* | 10/2020 | Preisinger | B25J 9/1694 |
| 2006/0250101 A1* | 11/2006 | Khatib | B25J 9/1633 318/568.2 |
| 2008/0297092 A1 | 12/2008 | Nihei | |
| 2015/0081098 A1* | 3/2015 | Kogan | B25J 9/1656 700/258 |
| 2016/0089789 A1 | 3/2016 | Sato | |

(Continued)

FOREIGN PATENT DOCUMENTS

EP  2383624 A2  11/2011

OTHER PUBLICATIONS

European Search Report for European Patent Application No. 17186599.1-1205 dated Feb. 26, 2018.

*Primary Examiner* — Abby Y Lin
*Assistant Examiner* — Dylan M Katz
(74) *Attorney, Agent, or Firm* — Lempia Summerfield Katz LLC

(57) ABSTRACT

A method for operating a hand-guided robot having a jointed arm and an end effector is provided. As part of the method, a moment is measured at each joint while the robot is being hand-guided or subjected to a mechanical tension due to contact with an external object. Based on the measured moment, an external moment affecting the robot is determined. Then, a correction factor for a position of the end effector is computed based on the external moment and an absolute accurate model of the robot. Then, a current position of the end effector is computed based on a correction model in dependence on the correction factor. A corresponding storage medium, data processing device, robotic system, and tracking system are also provided.

18 Claims, 2 Drawing Sheets

(56) References Cited

U.S. PATENT DOCUMENTS

| | | | |
|---|---|---|---|
| 2016/0129588 A1* | 5/2016 | Pfaff | B25J 9/0081 |
| | | | 700/256 |
| 2016/0221189 A1 | 8/2016 | Nilsson | |
| 2018/0074475 A1* | 3/2018 | Schreiber | G05B 23/02 |

* cited by examiner

OPERATING A HAND-GUIDED ROBOT

This application claims the benefit of EP 17186599.1, filed on Aug. 17, 2017, which is hereby incorporated by reference in its entirety.

BACKGROUND

The present embodiments relate to operating a hand-guided robot and to a corresponding robotic system.

It is common practice today to model a behavior (e.g., a movement) and a resulting position or pose of a robot using a mathematical model. These models are, however, not perfectly accurate in all situations or scenarios. Typically, robots or the corresponding models are calibrated in a setting where the robot or at least an arm of the robot may freely move in all directions to cover a complete range of motion and all possible poses. A pose in this sense describes a position as well as an orientation. Some models may take the essentially static influence of gravity, which may induce a moment (e.g., a moment of force or a torque in the robot, such as in a joint of the arm of the robot) into account. Even these models do, however, not always reliably reproduce the actual position of, for example, the respective robot end effector.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved positional accuracy of a robot and corresponding uses are provided.

A method according to one or more of the present embodiments for operating a hand-guided robot having a jointed arm and an end effector connected to one end of the jointed arm is provided. The jointed arm has at least one joint. As part of this method, a moment is measured at each joint of the arm while the robot is being hand-guided and/or subjected to a mechanical tension due to contact with an external object. The external object may, for example, be a stationary part of an apparatus on which the robot is working. The mechanical tension or tensioning may be a mechanical stress or pressure influencing, for example, hindering, limiting, or restricting a movement or motion of the end effector, the jointed arm, or a part thereof.

Another act of the method includes determining at least one external moment affecting the robot based on the at least one measured moment. The measured moment as well as the external moment may be moments of force (e.g., a respective torque).

Another act of the method includes computing a positional correction factor for a position of the end effector based on the at least one external moment and an absolute accurate model of the robot.

Another act of the method includes computing a current position of the end effector based on a correction model in dependence on the correction factor. The correction factor compensates a dynamic influence on the position of the end effector.

The positional correction factor may, in other words, be used to specify and/or minimize a difference between a calculated or modeled (e.g., an assumed) position of the end effector and an objective, actual position.

A hand-guided robot is a robot that may be moved or positioned manually. This refers, for example, to a position and/or orientation (e.g., a pose of the end effector). To allow this hand-guided positioning of the robot or the end effector, the robot features a corresponding specialized control system or feedback control. This enables the robot to follow the manual positioning or guidance in a consistent and jitter free manner. Nevertheless, the robot may be motorized and may include its own drive system or system of one or more actuators. If the robot is thus equipped, a user may guide (e.g., move) the end effector very precisely and jitter free since the positioning of the end effector may be assisted by the robot. This may be advantageous when the robot itself and/or a load the robot is carrying is particularly heavy so that the robot may ordinarily not be moved easily or precisely by an unassisted user.

Since it may not be precisely foreseen how a user may guide or interact with the robot, it is in practice not possible to precisely model or predict all forces, moments, and interactions that may occur during operation of the robot. If, for example, a user brings the end effector or a part of the jointed arm in contact with a stationary external object, the robot may not change a position and/or orientation as would be predicted or modeled by a typical conventional model that does not take into account external moments. In conventional models and robotic systems, this may lead to significant positioning errors of the robot as a whole and of the end effector, for example. These errors may be on the order of several millimeters or even centimeters. The position of the end effector calculated by such an internal model of the robot may therefore differ significantly from an objectively measured actual position with respect to a surrounding reference frame such as a fixed world coordinate system.

The mechanical tension and the external moment or moments are taken into account in determining the current position of the end effector. This results in the computed current position more closely matching the objective actual position of the end effector. The improved precision of the computed current position of the end effector is an advantage but may also form a basis for any number of other applications or use cases that rely on precise knowledge of the current position of the end effector. A more precise knowledge of the current position of the end effector may, for example, enable a higher degree of automation in complex robot assisted tasks and/or lead to a lowered risk of damaging the robot, a tool or object handled or manipulated by the robot, and/or a surrounding of the robot.

By measuring the acting or effective moment at each joint or axis of the jointed robot arm, the external moment or moments may be quickly, easily, and precisely determined from or based on the corresponding measured actual values (e.g., the actual values).

The end effector is, in accordance with the usual sense of the word in the field of robotics, the last element, member, or device in a kinematic chain including the jointed arm as well as the end effector itself. The end effector may be attached to the robot arm via a robot flange. The jointed arm and the end effector may together also be denoted as a robot manipulator or a manipulator of the robot. The end effector may, for example, be a gripping device or a tool fitted to or held by a corresponding receptacle. The end effector and the robot flange may be located or arranged at a distal end of the jointed arm. The other end of the jointed arm may be formed by or connected to a foot or base of the robot. This foot or base may, for example, be stationary with respect to a surrounding of the robot, while the manipulator (e.g., the jointed arm and the end effector) may move around with respect to the foot or base of the robot. The position of the end effector may also be denoted as or refer to a tool center point (TCP) or a position of this tool center point.

The external moment may effectively, partly, or in total be caused or influenced by the mechanical tension or tensioning and/or by a force exerted by a user for guiding the robot.

Computing the positional correction factor and/or the current position of the end effector may include one or more calculations and/or one or more evaluations each. Computing the positional correction factor and/or the current position of the end effector may also include automatically retrieving any needed parameters or respective current values, such as, for example, a respective joint parameter for each joint of the jointed arm, and/or reading corresponding values from a predetermined provided table or characteristic diagram. The respective computing or computation may be carried out or executed automatically. It may be advantageous if this is done continuously or with a predetermined frequency so that the respective current position of the end effector is computed and therefore known while the robot is moving or being operated. To enable the automatic computing or computation or determination of the at least one external moment, the positional correction factor, and/or the current position of the end effector, a respective predetermined model may be provided.

While established conventional methods and the corresponding models sometimes consider essentially static or constant effects such as Earth's gravity, one or more of the present embodiments may also take into account dynamic or situational influences or effects. In a development, the measured moment includes effects of a centrifugal force and/or a Coriolis force affecting the arm and/or the end effector. These forces or effects may contribute to or influence the current position of the end effector. Taking these forces or effects into account for computing the current position of the end effector may therefore result in an improved precision or accuracy. If, for example, the end effector is guided by a user in a horizontal arc, this motion may result in a measurable moment essentially perpendicular to the motion induced by the user. Measuring this moment, which may stretch out the arm, and taking the moment into account through the positional correction factor in computing the current position of the end effector leads to a more precise reflection or representation of reality by the computed values or coordinates. Since the sizes or values of these forces or effects depend on not only a path along which the robot is guided but also a speed or velocity with which the robot is being guided along a path, the sizes or values of these forces or effects are considered dynamic influences or effects.

In a development, the end effector or a tool attached thereto is brought into contact with the external object or a second external object, and the position of the external object or the second external object, respectively, is determined based on the computed current position of the end effector. By intentionally or unintentionally bringing the end effector into physical (e.g., mechanical) contact with the respective external object and computing the current position of the end effector while the end effector is still in contact with the external object, the robot may, in other words, effectively be used as a spatial mapping system. Determining the position of the external object based on the current position of the end effector may, for example, be done through a simple mathematical operation by adding an object vector to the computed current position of the end effector. This object vector may be predetermined based on an exact point, such as the tool center point, of the end effector used as a reference or substitution for the position of the end effector as a whole.

The object vector may also depend on an exact physical form or shape of the end effector that determines where the end effector comes into contact with any external object. If, for example, a position of a center point of the end effector is used to describe the position of the end effector as a whole, then this center point may not necessarily come into direct contact with the external object since the center point may be surrounded by material of the end effector itself.

The described approach for determining the spatial position of the external object using the robot is an advantageous development or extension of the previously described method for computing the current position of the end effector, because the effects resulting from the physical contact between the end effector and the external object are used for determining the position of the external object. Since the robot is or may be hand-guided into contact with the external object, a precise point of the external object where a position is determined may be precisely and easily chosen. It may also be possible to bring the end effector into contact with the external object at a contact point that is, from an outside perspective, at least partly hidden inside the external object or behind another part of the external object or behind another external object. Therefore, the presently described method offers a distinct advantage over optical systems that are limited to or by a corresponding line of sight. The presently described approach may be used to map a position, shape, or form of a complexly shaped external object. This may be done independently of a lighting condition and a background noise, which is an advantage of the present method over optical and ultrasound systems.

In a further development, the end effector or the tool is sequentially brought into contact with the respective external object in or at multiple different contact points (e.g., at multiple different points of the external object). This is not to be confused with multiple contacts or contact points occurring at, for example, the tips of multiple individual finger elements of the end effector while gripping the external object when the end effector includes a multi-finger gripping device. Rather, a single point of the end effector may be brought into contact with the external object, then moved away from the external object and brought into contact with the external object again at a different contact point.

It may also be possible to slide the end effector along a surface of the external object from one contact point to another.

The respective current position of the end effector is then computed in each contact point (e.g., for each instance or occurrence of the contact between the end effector and the external object). The respective external object is then virtually modeled based on the multiple computed respective current positions. This provides that by touching the end effector to the external object at different contact points and computing the respective current positions, a shape of the external object may be determined and modeled in three dimensions. This is enabled by the precise determination of the current position of the end effector under and taking into account a mechanical tension and/or external moment. In one embodiment, the end effector or the tool is brought into contact with the external object at more than two (e.g., at more than three) different contact points. A higher number of contact points and respective computed current positions enables a more precise and detailed virtualization (e.g., virtual modeling of the external object).

In a further development of the present embodiments, the external object or a second external object is held by the end effector. The current position of the end effector is then continuously computed. A path of the held external object is then determined or computed based on the continuously computed current positions of the end effector to track a position and/or a movement of the external object. Since the robot may be hand-guided, providing that the external object may be individually moved through space on an essentially arbitrarily complex path by guiding the robot correspondingly, this approach provides a fast, simple, and effective way of recording or virtualizing the path of the external object. Through this method, the robot may, in other words, be used as a tracking or motion capturing system. This has the advantage that no optical system is needed, and therefore, no line of sight has to be considered. Another advantage is that the path of the external object and therefore the movements of the robot do not have to be programmed in advance, significantly lowering a required time and effort. Since the robot may hold the external object jitter free over arbitrarily long periods of time, this approach may be combined with an augmented or virtual reality system to precisely track and position the external object in real space and in virtual space.

Another aspect of the present embodiments is a storage medium (e.g., a non-transitory computer-readable storage medium) containing a program code designed or configured to perform a method in accordance with at least one embodiment of the method on execution of the program code by a processing unit.

Another aspect of the present embodiments is a data processing device including a processing unit and a storage medium. The processing unit is configured to execute the program code contained within the storage medium. The data processing device may also include an input interface for receiving the values of the measured moment as well as, for example, data about a current configuration, a current rotation, or state of any joint and/or axis of the robot and/or a control signal sent from a control unit (ECU) to at least one drive or motor of the robot. The data processing device may also include an output interface for providing the computed correction factor and/or the computed current position or corresponding coordinates of the end effector and/or the external object to another device or system.

Another aspect is a robotic system including a hand-guided robot having a jointed arm and an end effector connected to one end of the arm, where the jointed arm has at least one joint. The robotic system further includes a moment sensor (e.g., a torque sensor) in or at each joint and/or axis of the arm. These moment sensors are configured to measure a respective moment at each joint and/or axis of the arm (e.g., while the robot is being hand-guided and/or subjected to a mechanical tension due to contact with an external object). The robotic system further includes a data processing device in accordance with the present embodiments connected to each moment sensor via a respective data link or data connection.

For example, the data processing device and the robotic system may be configured to execute or perform at least one embodiment of the method.

The data processing device and the robotic system may include one or more computer or microchips for executing the respective program code.

In a further development of the robotic system, the robot is an industrial robot having at least six degrees of freedom (6-DOF).

Another aspect is a tracking system for tracking (e.g., for recording) a position and/or a movement of an external object. This tracking system includes a robotic system in accordance with the present embodiments, where the program code contained in the storage medium of the robotic system is designed or configured to perform at least one embodiment of the method when executed by the data processing device of the robotic system.

The embodiments and developments of the present invention described herein for at least one aspect of the present invention (e.g., for the method, the storage medium, the data processing device, the robotic system, and the tracking system), as well as the corresponding advantages, may be applied to any and all aspects of the present invention.

BRIEF DESCRIPTION OF THE DRAWINGS

Further advantages, features, and details derive from the following description of exemplary embodiments, as well as from the drawings. The features and feature combinations previously mentioned in the description as well as the features and feature combinations mentioned in the following description of the figures and/or shown in the figures alone may be employed not only in the respectively indicated combination but also in other combinations, or taken alone without leaving the scope of the present invention.

DETAILED DESCRIPTION

Figure 1:
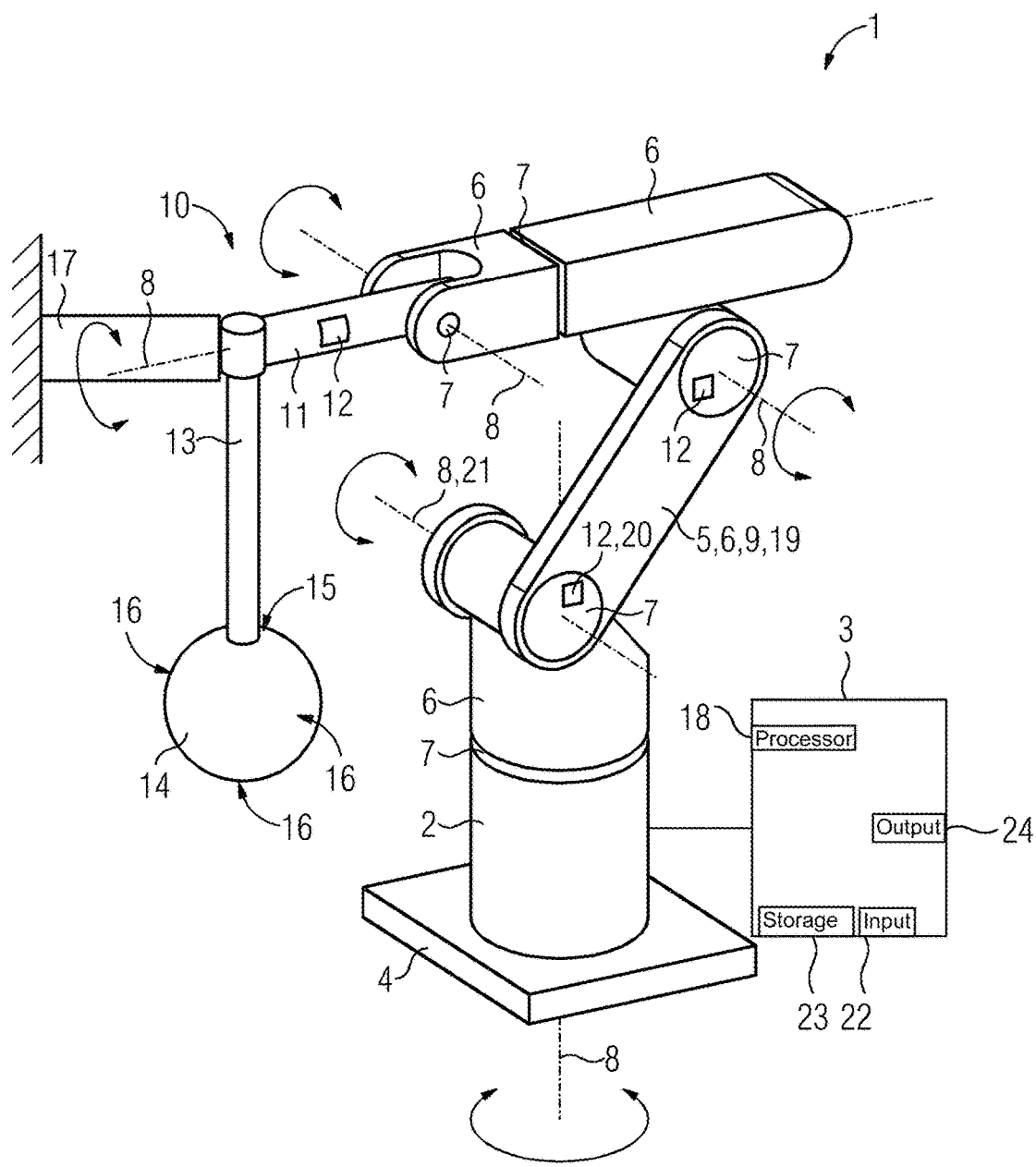
FIG. 1 schematically shows a perspective view of one embodiment of a robotic system.

FIG. 1 schematically shows a perspective view of a robotic system 1. The robotic system 1 includes a robot 2 and a data processing device 3 (e.g., a data processor) that is connected to the robot 2 via a data link. While the robot 2 and the data processing device 3 are shown separately, the data processing device 3 may also be integrated into the robot 2.

In the present example, the robot 2 is an industrial robot with a foot or base 4 that may be mounted in a fixed location such as, for example, a floor of an industrial workspace. Attached to the base 4 is a manipulator 5 of the robot 2. The manipulator 5 is formed by several links 6 and several joints 7 connecting the links 6. Each joint 7 enables rotation of a respective connected link 6 about a corresponding axis 8. In other examples, different types of joints or connections of the links 6, such as, for example, prismatic joints may also be used as part of the manipulator 5 or the robot 2. The links 6 and joins 7 form a robotic jointed arm 9. As part of the manipulator 5 and arranged at a distal end 10 of the arm 9, the robot 2 further includes an end effector 11. The end effector 11 may be connected to the arm 9 via a robot flange. Arranged in or at each of the joints 7 or the corresponding axes 8, respectively, is a respective moment sensor 12. Only some of these moment sensors 12 are shown in FIG. 1.

The end effector 11 includes a gripping or holding mechanism or device that in this example is holding a rod or probe 13. Since the probe 13 is rigidly held, the probe 13 may also be considered part of the end effector 11 since the probe 13 effectively is the last part or element of a kinematic chain that is formed by the manipulator 5 and begins at the base 4.

Figure 2:
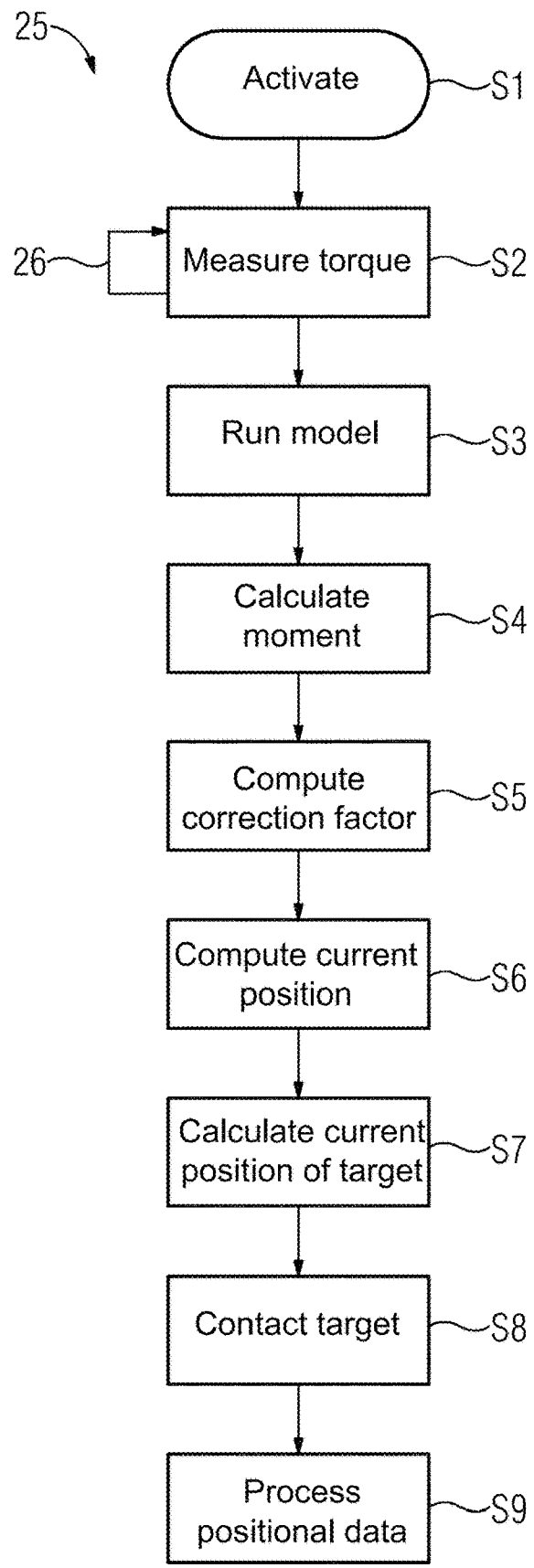
FIG. 2 schematically illustrates an exemplary flow chart of a method for operating the robotic system shown in FIG. 1.

FIG. 2 schematically shows an exemplary flow chart 25 illustrating a method for operating the robotic system 1 shown in FIG. 1. Below, the process acts of this method are described with reference to both FIG. 1 and FIG. 2.

The method starts at a process act S1. The robot 2 and the data processing device 3 may, for example, be activated. Alternatively, the process act S1 may be set to the point in time when a user starts hand-guiding the robot 2 or when the robot 2 is subjected to a mechanical tension.

In a process act S2, the moment sensors 12 continuously measure a respective torque. The continuous measurement is schematically indicated by a loop 26. The measured torque values are transmitted in real time from the moment sensors 12 to the data processing device 3, which receives the measured torque values through an input interface 18. The continuous measurement of the moment or torque may continue throughout the acts and processes described below.

In the present example, the robot 2 and, for example, the end effector 11 is guided so that the probe 13 is brought into contact with a target object 14 at a contact point 15. In the presently described example, the end effector 11 also—intentionally or unintentionally—comes into mechanical contact with a stationary external object 17 during this process.

The stationary external object 17 is fixedly positioned and limits a motion of the robot 2 (e.g., of the end effector 11). For example, the respective user may exert a force on one of the links 6 to move or position the robot 2 so that the probe 13 comes into mechanical contact with the target object 14 and the contact point 15. If, for example, the user exerts this force on a particular link 19 of the multiple links 6, this may be registered at a particular torque sensor 20 of the multiple moment sensors 12. An internal drive of the robot 2 may then be activated to support or assist with the intended movement of the manipulator 5. To do this, the drive may exert or put out a certain drive torque to rotate the link 19 about a corresponding axis 21 of the multiple axes 8. A value of this drive torque may also be transmitted to the data processing device 3. In a process act S3, a processing unit 22 of the data processing device 3 may run an internal model of the robot 2 using this drive torque as an input to calculate a resulting calculated position of the end effector 11. This internal model may be a simplified model of the robot 2 that may assume that the robot 2 or the manipulator 5 may move freely and unhindered.

The force exerted by the user to guide the manipulator 5 and/or by the stationary external object 17, which prevents the end effector 11 from moving further in the direction of the stationary external object 17 upon mechanical contact, may, however, exert or cause an additional external moment that may influence the actual motion of the manipulator 5 (e.g., of the end effector 11). Since the moment sensors 12 measure a total moment affecting the robot 2 at each joint 7 or axis 8, the external moment or moments affecting the robot 2 may be calculated in a process act S4. To achieve this, the processing unit 22 may calculate the external moment as a difference between the measured moments and the assumed or calculated moments that would result from the drive torque and a free unhindered motion or movement of the manipulator 5 based on the simplified internal model. In the process act S4, this data is, in other words, processed by the processing unit 22 of the data processing device 3 to determine the external moment caused by the user and/or the stationary external object 17.

In a process act S5, a correction factor may be computed by the processing unit 22 based on the external moment determined in process act S4 and the internal model used in process act S3. This correction factor may in the simplest case just be the external moment itself. The correction factor may, however, also be a different computed value such as, for example, a change in a position or pose of the manipulator 5 or the end effector 11 that would be caused by the external moment alone. Computing the correction factor may alternatively or additionally, for example, include modification or transformation of the corresponding value or values depending on a chosen implementation or reference frame.

In a process act S6, a current position of the end effector 11 is computed based on a correction model in dependence on the correction factor. This computed current position is more accurate than a calculated position output by the above-mentioned simplified internal model that does not take into account effects or influences of the external moment. For example, the external moment or a corresponding change in position or pose the external moment would cause on its own may be computed as the correction factor. The correction model may then subtract the respective corresponding value from the corresponding values used as input for the above-mentioned internal simplified model, which was also used in process act S3.

In one embodiment, the moment sensors 12 are arranged at each joint 7 or at each axis 8. If, for example, the drive torque acts on the axis 21, then an actual resulting moment at the end effector 11 may differ from its calculated or modeled value due to numerous factors such as a joint elasticity, a transmission elasticity, a backlash, a hysteresis, a temperature influence, etc. affecting parts of the manipulator 5 arranged between the drive or the axis 21 and the end effector 11. The arrangement of the moment sensors 12 at each joint 7 or axis 8 therefore represents a particular advantage since the moments measured by the moment sensors 12 automatically include all of these effects and influences that may not be reliably and precisely modeled with reasonable effort. Since the computed current position of the end effector 11 is partly based on the moments measured by the moment sensors 12, the computed current position of the end effector 11 also automatically takes into account the above-mentioned effects and influences in a particularly easy and effective manner.

In act S7, a current position of the target object 14 is calculated based on the computed current position of the end effector 11. This position of the target object 14 may, for example, be considered equal to the position of the contact point 15. The position of the contact point 15 may either be considered to be equal to the position of the end effector 11 or may simply be calculated from the position of the end effector 11 by adding the known length of the probe 13.

In a process act S8, the probe 13 is brought into contact with the external target object 14 at multiple additional contact points 16. Each time the probe 13 is in contact with one of these additional contact points 16, the corresponding current position of the end effector 11 and the target object 14 is computed. In this manner, multiple positional values that may advantageously be used to map a surface or shape of the target object 14 are determined for the target object 14.

Additionally or alternatively, the target object 14 may be rigidly attached to the probe 13 or the end effector 11. This may, for example, be done after the multiple positional values for the target object 14 have been obtained. The target object 14 may then be moved through space by guiding the robot 2 or the manipulator 5. By computing the respective current position of the end effector 11 and the target object 14 continuously or at multiple different points in time, a path of the target object 14 may be determined and recorded.

In a process act S9, the positional data for the target object 14 is processed by the processing unit 22 to automatically generate a virtual model and/or a virtual path of the target object 14. The virtual model and/or the virtual path, respectively, may, for example, be used in a virtual reality or in an augmented reality application.

To carry out all of the above-mentioned calculations and computations, the processing unit 22 may access a storage medium 23 (e.g., a non-transitory computer-readable storage medium) of the data processing device 3. This storage medium 23 may hold or contain the necessary instructions as well as the mentioned models in the form of a program code or electronic data.

Any of the computed, calculated, or measured values or data may also be provided or output to any other system or device or model through an output interface 24 of the data processing device 3 for further processing.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a hand-guided robot having a jointed arm with at least one joint, and an end effector connected to one end of the jointed arm, the method comprising:
   measuring a moment at each joint of the at least one joint of the jointed arm while the hand-guided robot is being hand-guided or subjected to a mechanical tension due to contact with an external object;
   identifying a drive torque exerted by the hand-guided robot;
   determining a position of the end effector using the identified drive torque as an input to an absolute accurate model of the robot;
   determining at least one external moment affecting the robot based on the at least one measured moment;
   computing a positional correction factor for the position of the end effector using the at least one external moment as an input to the absolute accurate model of the robot; and
   computing a current position of the end effector based on a correction model in dependence on the correction factor and the position of the end effector, the current position of the end effector reflecting an objective actual position of the end effector,
   wherein the correction factor compensates a dynamic influence on the position of the end effector.

2. The method of claim 1,
   wherein the at least one measured moment includes effects of a centrifugal force, a Coriolis force affecting the arm, the end effector, or any combination thereof.

3. The method of claim 1,
   wherein the end effector or a tool attached to the end effector is brought into contact with the external object or another external object, and
   wherein the position of the external object or the other external object, respectively, is determined based on the computed current position of the end effector.

4. The method of claim 2,
   wherein the end effector or a tool attached to the end effector is brought into contact with the external object or another external object, and
   wherein the position of the external object or the other external object, respectively, is determined based on the computed current position of the end effector.

5. The method of claim 4,
   wherein the end effector or the tool is sequentially brought into contact with the respective external object in multiple different contact points,
   wherein the respective current position of the end effector is computed in each contact point, and
   wherein the respective external object is virtually modeled based on the multiple computed respective current positions.

6. The method of claim 1,
   wherein the external object or another external object is held by the end effector,
   wherein the current position of the end effector is continuously computed, and
   wherein a path of the held external object is determined based on the continuously computed current positions of the end effector to track a position, a movement of the external object, or the position and the movement of the external object.

7. The method of claim 1,
   wherein the external object or another external object is held by the end effector,
   wherein the current position of the end effector is continuously computed, and
   wherein a path of the held external object is determined based on the continuously computed current positions of the end effector to track a position, a movement of the external object, or the position and the movement of the external object.

8. A non-transitory computer-readable storage medium that stores instructions executable by one or more processors to operate a hand-guided robot having a jointed arm with at least one joint, and an end effector connected to one end of the jointed arm, the instructions comprising:
   measuring a moment at each joint of the at least one joint of the jointed arm while the hand-guided robot is being hand-guided or subjected to a mechanical tension due to contact with an external object;
   identifying a drive torque exerted by the hand-guided robot;
   determining a position of the end effector using the identified drive torque as an input to an absolute accurate model of the robot;
   determining at least one external moment affecting the robot based on the at least one measured moment;
   computing a positional correction factor for the position of the end effector using the at least one external moment as an input to the absolute accurate model of the robot; and
   computing a current position of the end effector based on a correction model in dependence on the correction factor and the position of the end effector, the current position of the end effector reflecting an objective actual position of the end effector,
wherein the correction factor compensates a dynamic influence on the position of the end effector.

9. The non-transitory computer-readable storage medium of claim 8, wherein the at least one measured moment includes effects of a centrifugal force, a Coriolis force affecting the arm, the end effector, or any combination thereof.

10. The non-transitory computer-readable storage medium of claim 8, wherein the end effector or a tool attached to the end effector is brought into contact with the external object or another external object, and
wherein the position of the external object or the other external object, respectively, is determined based on the computed current position of the end effector.

11. The non-transitory computer-readable storage medium of claim 9, wherein the end effector or a tool attached to the end effector is brought into contact with the external object or another external object, and
wherein the position of the external object or the other external object, respectively, is determined based on the computed current position of the end effector.

12. The non-transitory computer-readable storage medium of claim 11, wherein the end effector or the tool is sequentially brought into contact with the respective external object in multiple different contact points,
wherein the respective current position of the end effector is computed in each contact point, and
wherein the respective external object is virtually modeled based on the multiple computed respective current positions.

13. The non-transitory computer-readable storage medium of claim 8, wherein the external object or another external object is held by the end effector,
wherein the current position of the end effector is continuously computed, and
wherein a path of the held external object is determined based on the continuously computed current positions of the end effector to track a position, a movement of the external object, or the position and the movement of the external object.

14. The non-transitory computer-readable storage medium of claim 12, wherein the external object or another external object is held by the end effector,
wherein the current position of the end effector is continuously computed, and
wherein a path of the held external object is determined based on the continuously computed current positions of the end effector to track a position, a movement of the external object, or the position and the movement of the external object.

15. A data processing device comprising:
a processor; and
a non-transitory computer-readable storage medium that stores instructions executable by the processor to operate a hand-guided robot having a jointed arm with at least one joint, and an end effector connected to one end of the jointed arm, the instructions comprising:
measuring a moment at each joint of the at least one joint of the jointed arm while the hand-guided robot is being hand-guided or subjected to a mechanical tension due to contact with an external object;
identifying a drive torque exerted by the hand-guided robot;
determining a position of the end effector using the identified drive torque as an input to an absolute accurate model of the robot;
determining at least one external moment affecting the robot based on the at least one measured moment;
computing a positional correction factor for the position of the end effector using the at least one external moment as an input to the absolute accurate model of the robot; and
computing a current position of the end effector based on a correction model in dependence on the correction factor and the position of the end effector, the current position of the end effector reflecting an objective actual position of the end effector,
wherein the correction factor compensates a dynamic influence on the position of the end effector.

16. A robotic system comprising:
a hand-guided robot having a jointed arm with at least one joint and an end effector connected to one end of the arm;
a moment sensor in or at each joint of the at least one joint of the arm; and
a data processing device connected to each moment sensor via a respective data link, the data processing device comprising:
a processor; and
a non-transitory computer-readable storage medium that stores instructions executable by the processor to operate the hand-guided robot, the instructions comprising:
measuring a moment at each joint of the at least one joint of the jointed arm while the hand-guided robot is being hand-guided or subjected to a mechanical tension due to contact with an external object;
identifying a drive torque exerted by the hand-guided robot;
determining a position of the end effector using the identified drive torque as an input to an absolute accurate model of the robot;
determining at least one external moment affecting the robot based on the at least one measured moment;
computing a positional correction factor for the position of the end effector using the at least one external moment as an input to the absolute accurate model of the robot; and
computing a current position of the end effector based on a correction model in dependence on the correction factor and the position of the end effector, the current position of the end effector reflecting an objective actual position of the end effector,
wherein the correction factor compensates a dynamic influence on the position of the end effector.

17. A robotic system comprising:
a hand-guided robot having a jointed arm with at least one joint and an end effector connected to one end of the arm;
a moment sensor in or at each joint of the at least one joint of the arm; and
a data processing device connected to each moment sensor via a respective data link, the data processing device comprising:

a processor; and a non-transitory computer-readable storage medium that stores instructions executable by the processor to operate the hand-guided robot, the instructions comprising:

measuring a moment at each joint of the at least one joint of the jointed arm while the hand guided robot is being hand-guided or subjected to a mechanical tension due to contact with an external object;

identifying a drive torque exerted by the hand-guided robot;

determining a position of the end effector using the identified drive torque as an input to an absolute accurate model of the robot;

determining at least one external moment affecting the robot based on the at least one measured moment;

computing a positional correction factor for the position of the end effector using the at least one external moment as an input to the absolute accurate model of the robot; and computing a current position of the end effector based on a correction model in dependence on the correction factor and the position of the end effector, the current position of the end effector reflecting an objective actual position of the end effector, wherein the correction factor compensates a dynamic influence on the position of the end effector, and wherein the robot is an industrial robot having at least six degrees of freedom.

18. A tracking system for tracking a position, a movement, or a position and a movement of an external object, the tracking system comprising:

a robotic system comprising:

a hand-guided robot having a jointed arm with at least one joint and an end effector connected to one end of the arm;

a moment sensor in or at each joint of the at least one joint of the arm; and a data processing device connected to each moment sensor via a respective data link, the data processing device comprising:

a processor; and a non-transitory computer-readable storage medium that stores instructions executable by the processor to operate the hand-guided robot, the instructions comprising:

measuring a moment at each joint of the at least one joint of the jointed arm while the hand guided robot is being hand-guided or subjected to a mechanical tension due to contact with an external object;

identifying a drive torque exerted by the hand-guided robot;

determining a position of the end effector using the identified drive torque as an input to an absolute accurate model of the robot;

determining at least one external moment affecting the robot based on the at least one measured moment;

computing a positional correction factor for the position of the end effector using the at least one external moment as an input to the absolute accurate model of the robot; and computing a current position of the end effector based on a correction model in dependence on the correction factor and the position of the end effector, the current position of the end effector reflecting an objective actual position of the end effector, wherein the correction factor compensates a dynamic influence on the position of the end effector, wherein the robot is an industrial robot having at least six degrees of freedom, wherein the end effector or a tool attached to the end effector is brought into contact with the external object or another external object, and wherein the position of the external object or the other external object, respectively, is determined based on the computed current position of the end effector.

* * * * *